Dec. 1, 1936.   R. S. DUTCHER   2,062,969
WOODWORKING MACHINE
Filed April 29, 1935   3 Sheets-Sheet 1
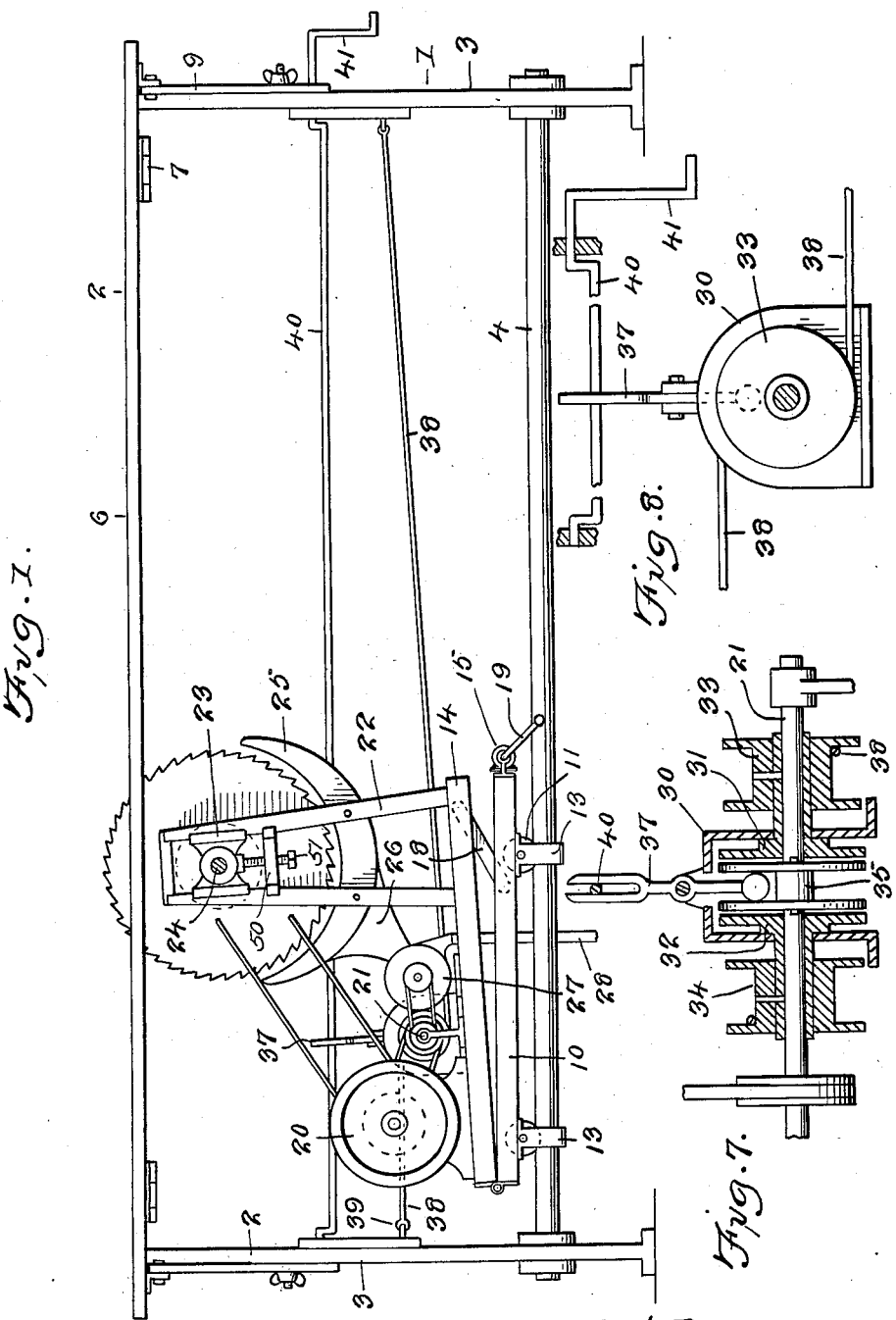
R. S. Dutcher
INVENTOR
BY Victor J. Evans & Co.
ATTORNEY

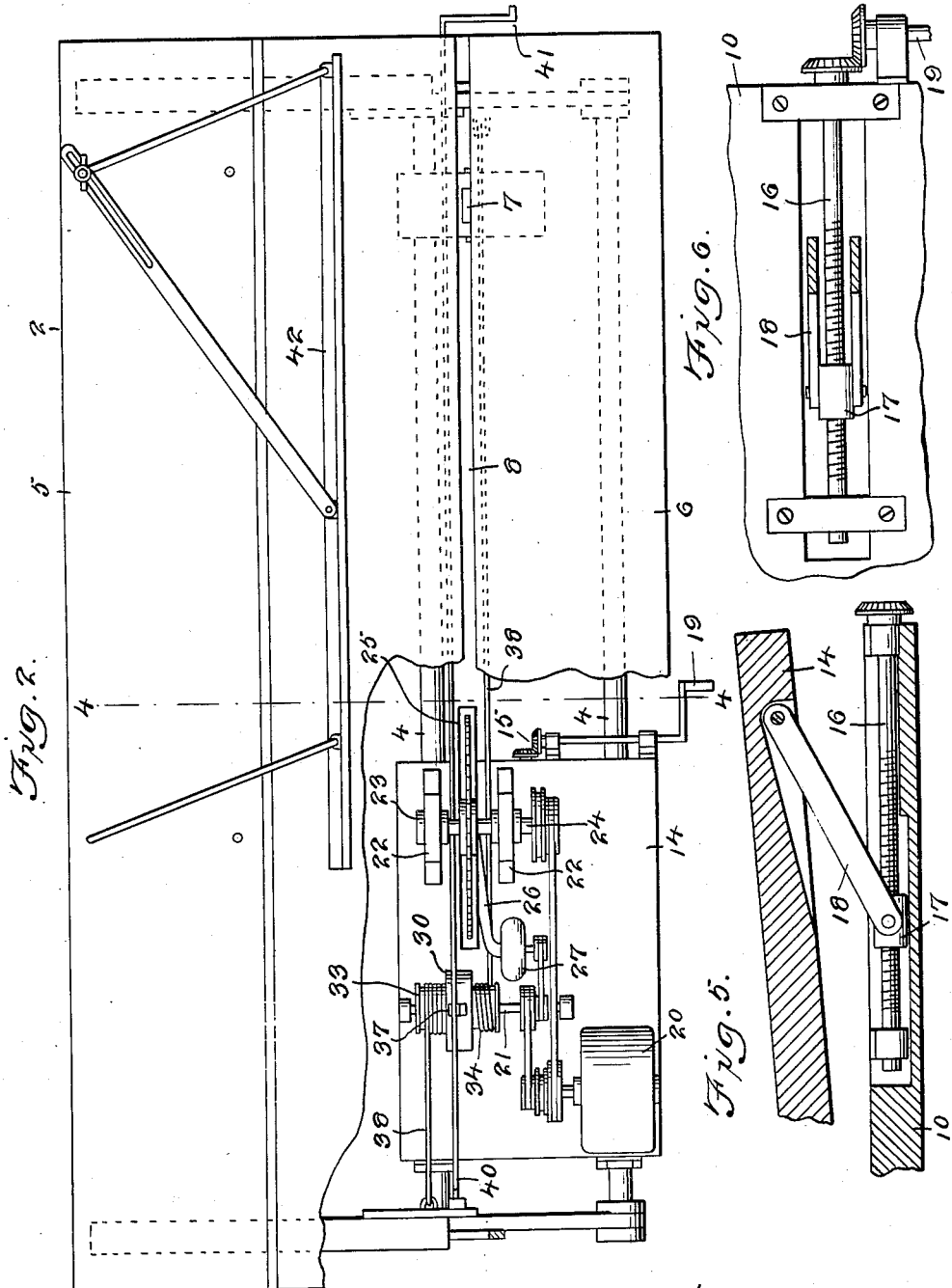

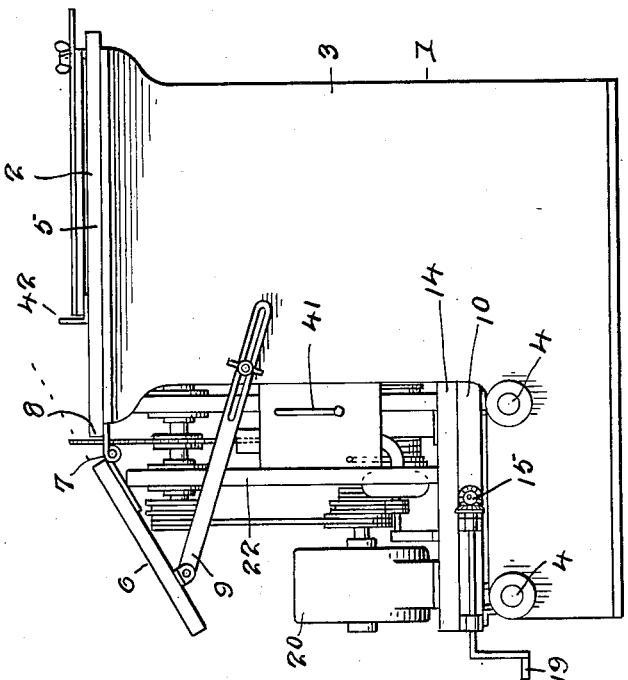

Patented Dec. 1, 1936

2,062,969

UNITED STATES PATENT OFFICE 2,062,969

WOODWORKING MACHINE

Roy S. Dutcher, Mount Pleasant, Mich.

Application April 29, 1935, Serial No. 18,896

1 Claim. (Cl. 143—35)

This invention relates to woodworking machines and has for the primary object the provision of an improved work tool carriage and mounting therefor for adapting the carriage to a workstand whereby the power driven tool of said carriage may be readily adjusted to different positions between the ends of the workstand and may be raised and lowered with respect to work on the stand by minimum effort on the part of the operator.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a woodworking machine constructed in accordance with my invention.

Figure 2 is a top plan view, partly broken away, showing a tool carriage mounted to the workstand.

Figure 3 is an end elevation, illustrating the device.

Figure 4 is a transverse sectional view illustrating the device.

Figure 5 is a fragmentary sectional view showing the means of raising and lowering the tool supporting portion of the carriage.

Figure 6 is a fragmentary plan view illustrating the same.

Figure 7 is a detail sectional view illustrating the clutch.

Figure 8 is a detail sectional view showing the control for the clutch.

Referring in detail to the drawings, the numeral 1 indicates the workstand consisting of a horizontally arranged work support 2 supported by legs 3 which are reinforced by track elements 4. The legs may be fastened in any suitable way to a base or like support. The work holder 2 includes a fixed portion 5 and a movable portion 6 hinged thereto, as shown at 7. The fixed and movable portions 5 and 6 are spaced to define a groove 8 extending longitudinally of the work holder through which may operate a saw or similar tool. The movable portion 6 may be held in various adjusted positions with respect to the fixed portion 5 by adjustable braces 9.

Operating upon the track elements 4 below the work holder 2 is a carriage 10. The carriage is supported by grooved rollers 11 engageable with the track elements and guards 13 are provided to prevent the rollers from becoming disengaged from the track elements. The carriage 10 has hinged to one end a platform 14. The platform may be raised and lowered with respect to the carriage through an operating mechanism 15, consisting of a feed shaft 16 journaled to the carriage and having threaded thereto a feed nut 17 to which is pivoted a link 18, the latter being pivoted to the platform 14. An operating shaft 19 is journaled to the carriage and is geared to the feed shaft whereby said feed shaft may be rotated in either direction for raising and lowering the platform with respect to the carriage. A power source 20, such as an electric motor is mounted upon the platform and also journaled upon said platform is a power shaft 21 belted to the power source 20 by an endless belt and pulleys, the latter preferably being of the variable speed type. Vertically arranged supports 22 are secured to the platform and have adjustably mounted thereto bearings 23 which support a tool shaft 24. The supports 22, each comprise a pair of spaced uprights which have the bearing 23 guided thereon. Each pair of uprights has fixed thereto and therebetween a cross plate 50, and threaded through the center of each cross plate 50 there is an adjusting bolt 51 each of which preferably has a swivel connection with the respective bearings 23. Various types of tools may be secured to the shaft, a circular saw being shown in the drawings. The shaft 24 is belted to the power source 20. Underlying the tool upon the shaft 24 is a collecting pan 25 having a throat 26 connected to a suction fan 27 mounted upon the platform. The discharge pipe of the fan is indicated by the character 28 for depositing waste materials at a selected place relative to the machine. The fan is belted to the shaft 21.

A clutch 30 is mounted on the shaft 21 and includes clutch elements 31 and 32 journaled on the shaft 21 and to which are secured drums 33 and 34. A clutch element 35 is splined to the shaft 21 and operates between the clutch elements 31 and 32. The position of the clutch element 35 may be varied through a pivotally mounted lever 37. The clutch element 35 may be engaged with either of the clutch elements 31 or 32 or may be disengaged from either of said clutch elements 31 and 32. Mounted on the drums 33 and 34 are cables 38 each connected to an end of the work support. Through the manipulation of the clutch the carriage may be caused to travel longitudinally of the work support by the power source 20. A crank shaft 40 is journaled to the work support and extends through a slot in the lever 37 and is equipped at one end with a crank handle 41 whereby the position of the lever 37 may be varied for the actuation of the clutch.

Mounted upon the fixed portion 5 of the work support is an adjustable work gauge 42, the work engaging portion of which may be adjusted towards and from the slot 8.

Having described the invention, I claim:

In a woodworking machine, rails, a carriage movable on the rails, means holding the carriage to engage with the rails, a platform having one end pivoted to the carriage, supports on the platform for the shaft of a rotary saw and means for rotating such saw, a screw journaled longitudinally in the carriage, a nut on the screw, links pivoted to the nut and to the platform, means limiting the movement of the nut on the screw, and means comprising a gear on the outer end of the screw and a handle-operated gear meshing therewith and carried by the carriage for turning the screw.

ROY S. DUTCHER.